US012592420B2

(12) United States Patent
Kim

(10) Patent No.: US 12,592,420 B2
(45) Date of Patent: Mar. 31, 2026

(54) BATTERY MANAGEMENT SYSTEM WITH SYNCHRONIZED WAKE-UP SIGNAL RECEPTION PERIOD AND COMMUNICATION METHOD THEREOF

(71) Applicant: LG ENERGY SOLUTION, LTD., Seoul (KR)

(72) Inventor: Ji Eun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 726 days.

(21) Appl. No.: 17/801,579

(22) PCT Filed: Jun. 29, 2021

(86) PCT No.: PCT/KR2021/008201
§ 371 (c)(1),
(2) Date: Aug. 23, 2022

(87) PCT Pub. No.: WO2022/005176
PCT Pub. Date: Jan. 6, 2022

(65) Prior Publication Data
US 2023/0128767 A1 Apr. 27, 2023

(30) Foreign Application Priority Data
Jun. 30, 2020 (KR) ........................ 10-2020-0080556

(51) Int. Cl.
*H01M 10/42* (2006.01)
(52) U.S. Cl.
CPC ..... *H01M 10/425* (2013.01); *H01M 10/4207* (2013.01); *H01M 2010/4271* (2013.01); *H01M 2010/4278* (2013.01); *H01M 2220/20* (2013.01)

(58) Field of Classification Search
CPC ........... H01M 10/425; H01M 10/4257; H01M 10/4207; H01M 10/441; H01M 2010/4271; H01M 2010/4278; H01M 2220/20
See application file for complete search history.

(56) References Cited

U.S. PATENT DOCUMENTS 9,293,935 B2 3/2016 Lee et al.
10,505,374 B2 12/2019 Kain et al.
(Continued)

FOREIGN PATENT DOCUMENTS

CN 207925612 U 9/2018
JP 2005-039632 A 2/2005
(Continued)

OTHER PUBLICATIONS

Office Action dated Dec. 13, 2024 issued in Chinese Patent Application No. 202180016773.7. (Note—KR 10-2020-0031931 A, JP 2005-039632 A, and US 2019/0237816 A1 cited in this CN Office Action were cited in previously-filed IDSs.)
(Continued)

*Primary Examiner* — Raymond Alejandro
(74) *Attorney, Agent, or Firm* — Morgan, Lewis & Bockius LLP

(57) ABSTRACT
A battery management system for a battery pack having a plurality of battery modules includes a master battery management system disposed in the battery pack and configured to transmit a wake-up signal, and slave battery management systems each configured to periodically check for the wake-up signal at a reception period and to transmit state information of a corresponding one of the battery modules to the master battery management system if the wake-up signal is received. A first slave battery management system, among the slave battery management systems, is configured to transmit a request signal to the master battery management
(Continued)

system at a start of the reception period of the first slave battery management system. Based on the request signal, a second slave battery management system is configured to synchronize the reception period of the second slave battery management system with the reception period of the first slave battery management system.

11 Claims, 9 Drawing Sheets

(56)                    References Cited

U.S. PATENT DOCUMENTS

| | | | |
|---|---|---|---|
| 11,251,630 B2 * | 2/2022 | Zhang | G01R 31/396 |
| 2012/0268069 A1 | 10/2012 | Park et al. | |
| 2014/0035365 A1 | 2/2014 | Yoo | |
| 2014/0079960 A1 | 3/2014 | Yun | |
| 2014/0300364 A1 * | 10/2014 | Choi | H04Q 9/00 |
| | | | 324/426 |
| 2015/0048779 A1 | 2/2015 | Lee | |
| 2016/0164662 A1 | 6/2016 | Kang et al. | |
| 2016/0254667 A1 | 9/2016 | Lee | |
| 2016/0294019 A1 * | 10/2016 | Yamauchi | H01M 10/48 |
| 2017/0060791 A1 | 3/2017 | Huh et al. | |
| 2019/0006724 A1 | 1/2019 | Cho et al. | |
| 2019/0237816 A1 | 8/2019 | Kim et al. | |
| 2019/0305386 A1 * | 10/2019 | Lee | G01R 31/392 |
| 2019/0379030 A1 * | 12/2019 | Golubkov | B60L 3/0046 |
| 2020/0036194 A1 | 1/2020 | Park et al. | |
| 2020/0144679 A1 | 5/2020 | Kam et al. | |
| 2020/0274369 A1 * | 8/2020 | Luo | B60L 3/0084 |
| 2023/0068623 A1 | 3/2023 | Kim et al. | |

FOREIGN PATENT DOCUMENTS

| | | | |
|---|---|---|---|
| JP | 2013-541314 | A | 11/2013 |
| JP | 2016-540412 | A | 12/2016 |
| JP | 2020-501482 | A | 1/2020 |
| KR | 10-2014-0019629 | A | 2/2014 |
| KR | 10-1433478 | B1 | 9/2014 |
| KR | 10-1483129 | B1 | 1/2015 |
| KR | 10-2015-0019902 | A | 2/2015 |
| KR | 10-2015-0044283 | A | 4/2015 |
| KR | 10-1561885 | B1 | 10/2015 |
| KR | 10-2016-0104391 | A | 9/2016 |
| KR | 10-2017-0024223 | A | 3/2017 |
| KR | 10-1779655 | B1 | 9/2017 |
| KR | 10-2019-0009635 | A | 1/2019 |
| KR | 10-2019-0040414 | A | 4/2019 |
| KR | 10-2046608 | B1 | 11/2019 |
| KR | 10-2020-0031931 | A | 3/2020 |
| KR | 10-2020-0052132 | A | 5/2020 |

OTHER PUBLICATIONS

International Search Report (with partial translation) and Written Opinion dated Oct. 8, 2021, for corresponding International Patent Application No. PCT/KR2021/008201.

Office Action dated Sep. 26, 2023, issued in corresponding Japanese Patent Application No. 2022-548529.

Office Action issued on Mar. 5, 2025 in Korean Patent Application No. 10-2020-0080556 (Note: KR 10-2020-0031931 A cited in this KR Office Action was cited in a prior IDS.).

Extended European Search Report dated Jan. 9, 2024, issued in corresponding European Patent Application No. 21832716.1 (Note: US 2020/0144679 A1 was previously cited.).

* cited by examiner

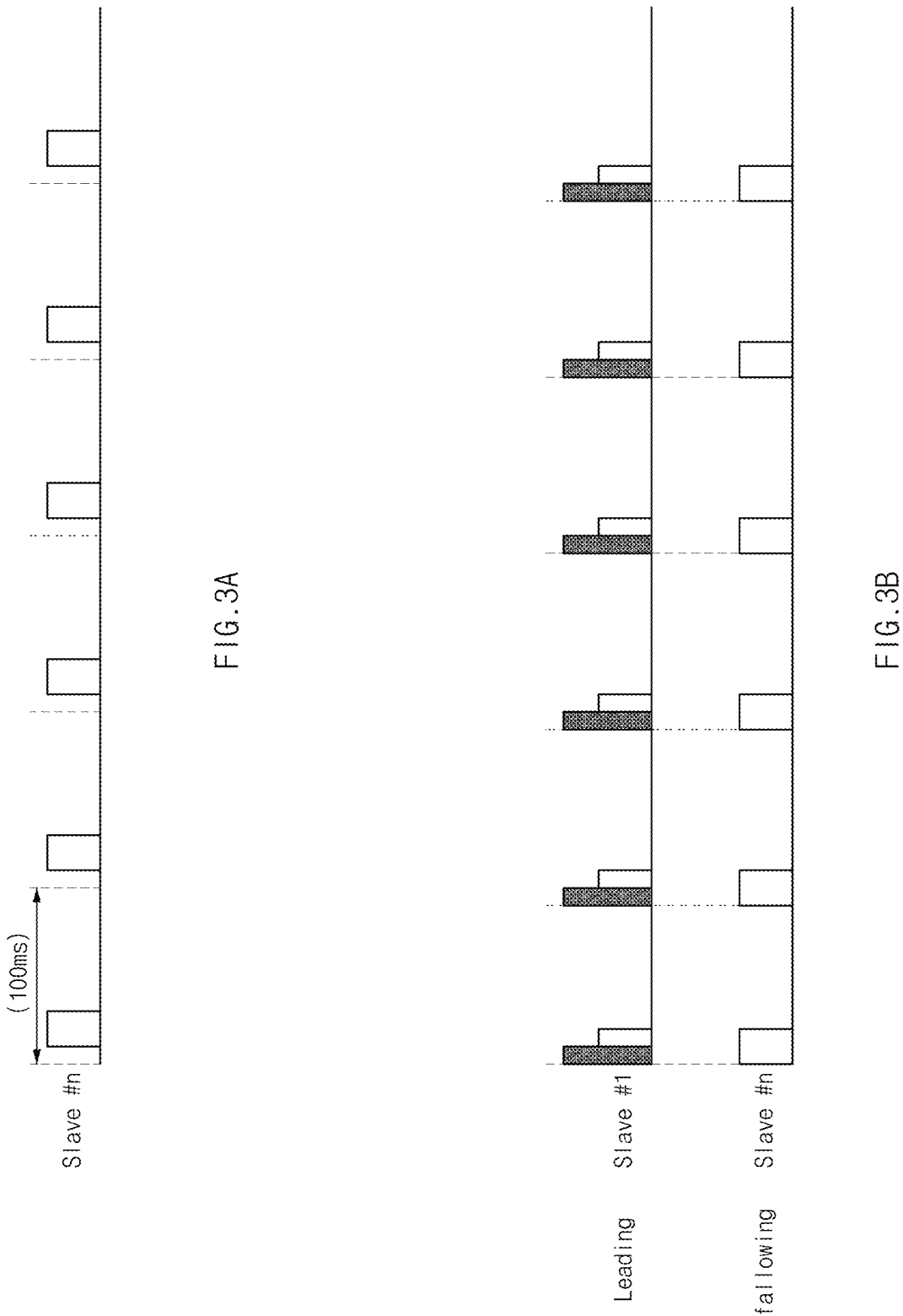

BATTERY MANAGEMENT SYSTEM WITH SYNCHRONIZED WAKE-UP SIGNAL RECEPTION PERIOD AND COMMUNICATION METHOD THEREOF

CROSS-REFERENCE TO RELATED APPLICATIONS

This application claims the benefit of Korean Patent Application No. 10-2020-0080556, filed on Jun. 30, 2020 in the Korean Intellectual Property Office, the disclosure of which is incorporated herein in its entirety by reference.

TECHNICAL FIELD

The present invention relates to a battery management system for performing wireless communication and a wireless communication method between battery management systems.

BACKGROUND ART

In general, when a vehicle is parked, the power of a master battery management system of a battery management system performing wireless communication is turned off, and only a slave battery management system that is mounted on a battery module and receives constant power is turned on.

If a user starts a vehicle and power is turned on to the master battery management system, the slave battery management systems transmit current state information of the battery module to the master battery management system. However, since it is difficult to predict when the master battery management system will be powered on. The slave battery management system wakes up periodically to operate the receiver and check if there is a signal transmitted from the master battery management system.

Since the wake-up signal of these master battery management systems is transmitted randomly, in order for the slave battery management system to quickly recognize the signal from the master battery management system, it is necessary to operate the receiver frequently. However, when the receiver is frequently operated, the current consumption of the slave battery management system using the power of the battery module increases, so that the risk of the battery module being discharged increases when the vehicle is parked.

Likewise, a wake-up time for the entire battery system to return to normal operation when the slave battery management system recognizes a signal transmitted from the master battery management system after the vehicle's ignition is turned on and a sleep current consumed by the slave battery management system while the vehicle is parked have a trade-off relationship with each other. In general, unless the current consumption of the slave battery management system is improved by hardware, the current consumption of the system is determined according to a wake-up time required by the battery management system.

DISCLOSURE OF THE INVENTION

Technical Problem

The present invention has been devised to solve the above problems, and an object of the present invention is to provide a battery management system that synchronizes the reception period of the slave battery management system after the slave battery management system transmits a request signal for requesting a wake-up signal to the master battery management system, thereby reducing the current consumption of the battery module and efficiently using power and is capable of reducing a wake-up time of the battery management system, and a communication method thereof.

Technical Solution

A battery management system according to an embodiment of the present invention includes a master battery management system configured to transmit a wake-up signal to a plurality of slave battery management systems (BMS), and a plurality of slave battery management systems configured to transmit state information of a battery module to the master battery management system upon receiving the wake-up signal from the master battery management system, wherein at least one slave battery management system among the plurality of slave battery management systems transmits a request signal to the master battery management system, and synchronizes a reception period in which the plurality of slave battery management systems receive the wake-up signal from the master battery management system based on the request signal.

A communication method of a battery management system according to an embodiment of the present invention includes transmitting a request signal from at least one slave battery management system among a plurality of slave battery management systems to a master battery management system, synchronizing a reception period during which the plurality of slave battery management systems receive a wake-up signal from the master battery management system based on the request signal, transmitting the wake-up signal to the plurality of slave battery management systems in response to receiving the request signal from the master battery management system, and transmitting state information of a battery module to the master battery management system based on the plurality of slave battery management systems receive the wake-up signal from the master battery management system.

Effects of the Invention

According to the battery management system and its communication method of the present invention, as synchronizing the reception period of the slave battery management system after the slave battery management system transmits a request signal for requesting a wakeup signal to the master battery management system, power can be used efficiently by reducing the current consumption of the battery module and the wake-up time of the battery management system can be shortened.

BRIEF DESCRIPTION OF THE DRAWINGS

FIGS. 3A and 3B are diagrams for comparing power efficiency of a conventional battery management system and a battery management system according to an embodiment of the present invention.

MODES FOR CARRYING OUT THE INVENTION

Figure 1:
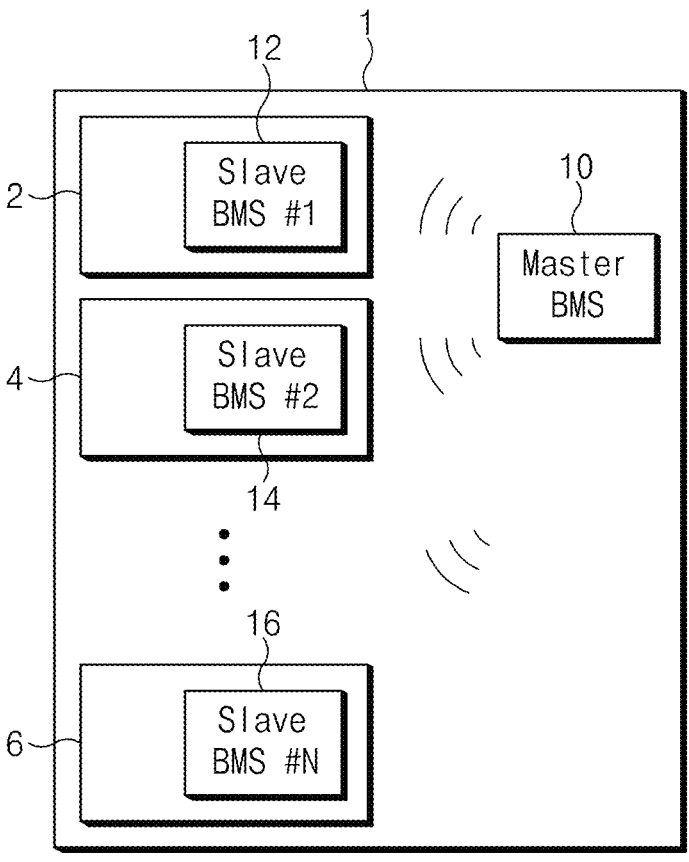
FIG. 1 is a diagram illustrating the operation of a master and slave battery management system.

Hereinafter, various embodiments of the present invention will be described in detail with reference to the accompanying drawings. In this document, the same reference numerals are used for the same components in the drawings, and duplicate descriptions of the same components are omitted.

For the various embodiments of the present invention disclosed in this document, specific structural or functional descriptions have been exemplified for the purpose of describing the embodiments of the present invention only and various embodiments of the present invention may be implemented in various forms and should not be construed as being limited to the embodiments described in this document.

Expressions such as "first", "second", "first", or "second" used in various embodiments may modify various elements regardless of their order and/or importance, and do not limit the corresponding elements. For example, without departing from the scope of the present invention, a first component may be referred to as a second component, and similarly, a second component may be renamed and referred to as a first component.

Terms used in this document are only used to describe a specific embodiment, and may not be intended to limit the scope of other embodiments. The terms of a singular form may include plural forms unless otherwise specified.

All terms used herein, including technical or scientific terms, may have the same meaning as commonly understood by a person of ordinary skill in the art. Terms defined in a commonly used dictionary may be interpreted as having the same or similar meaning as the meaning in the context of the related technology, and are not interpreted as ideal or excessively formal meanings unless explicitly defined in this document. In some cases, even terms defined in this document cannot be interpreted to exclude embodiments of the present invention.

FIG. 1 is a diagram illustrating the operation of a master and slave battery management system.

A plurality of battery modules 2, 4, and 6 are connected in series or in parallel to the battery pack 1. Each of the battery modules 2, 4, and 6 includes a plurality of battery cells, and slave battery management systems 12, 14, and 16 are respectively disposed. Each of the slave battery management system 12, 14, and 16 monitors by measuring the state of the plurality of battery modules 2, 4, and 6, such as temperature, voltage or current, and transmits the monitored information to the upper-level system and receives a control command of the battery cell from the upper-level system to control the connected battery cell.

A plurality of battery modules 2, 4, and 6 are connected in series or in parallel to form the battery pack 1. A master battery management system 10 is disposed in the battery pack 1. In addition, the master battery management system 10 receives the monitoring information of each battery module from the slave battery management systems 12, 14, and 16 respectively arranged in the battery modules 2, 4, and 6 and transmits the received monitoring information to the upper-level system, and receives various commands from the upper-level system and transmits the received various commands to the corresponding slave battery management systems 12, 14, and 16.

Meanwhile, in the battery management system according to an embodiment of the present invention, the master battery management system 10 may transmit a wake-up signal to the plurality of slave battery management systems 12, 14, and 16 during operation. Specifically, when receiving a request signal from any one of the plurality of slave battery management systems 12, 14, and 16, the master battery management system 10 may transmit a wake-up signal to the plurality of slave battery management systems 12, 14, and 16.

And when receiving a wake-up signal from the master battery management system 10, the plurality of slave battery management systems 12, 14, and 16 may transmit state information of the battery module to the master battery management system 10. In addition, at least one slave battery management system among the plurality of slave battery management systems 12, 14, 16, for example, as a representative slave battery management system, transmits a request signal to the master battery management system 10, based on the corresponding request signal, the plurality of slave battery management systems 12, 14, and 16 may synchronize the reception period for receiving the wakeup signal from the master battery management system 10.

Figure 2A:
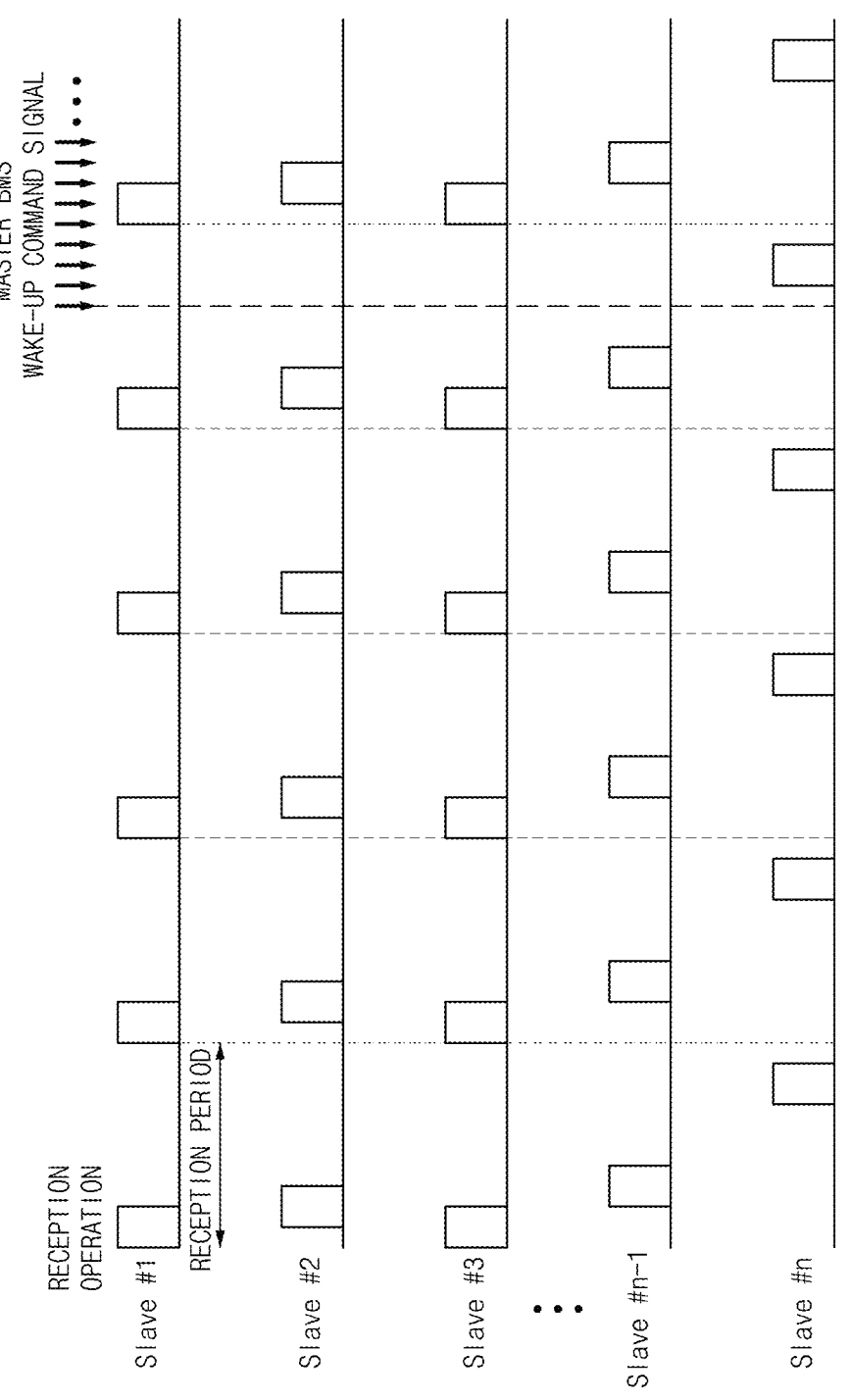
FIG. 2A is a diagram illustrating a communication operation of a conventional battery management system.
Figure 2B:
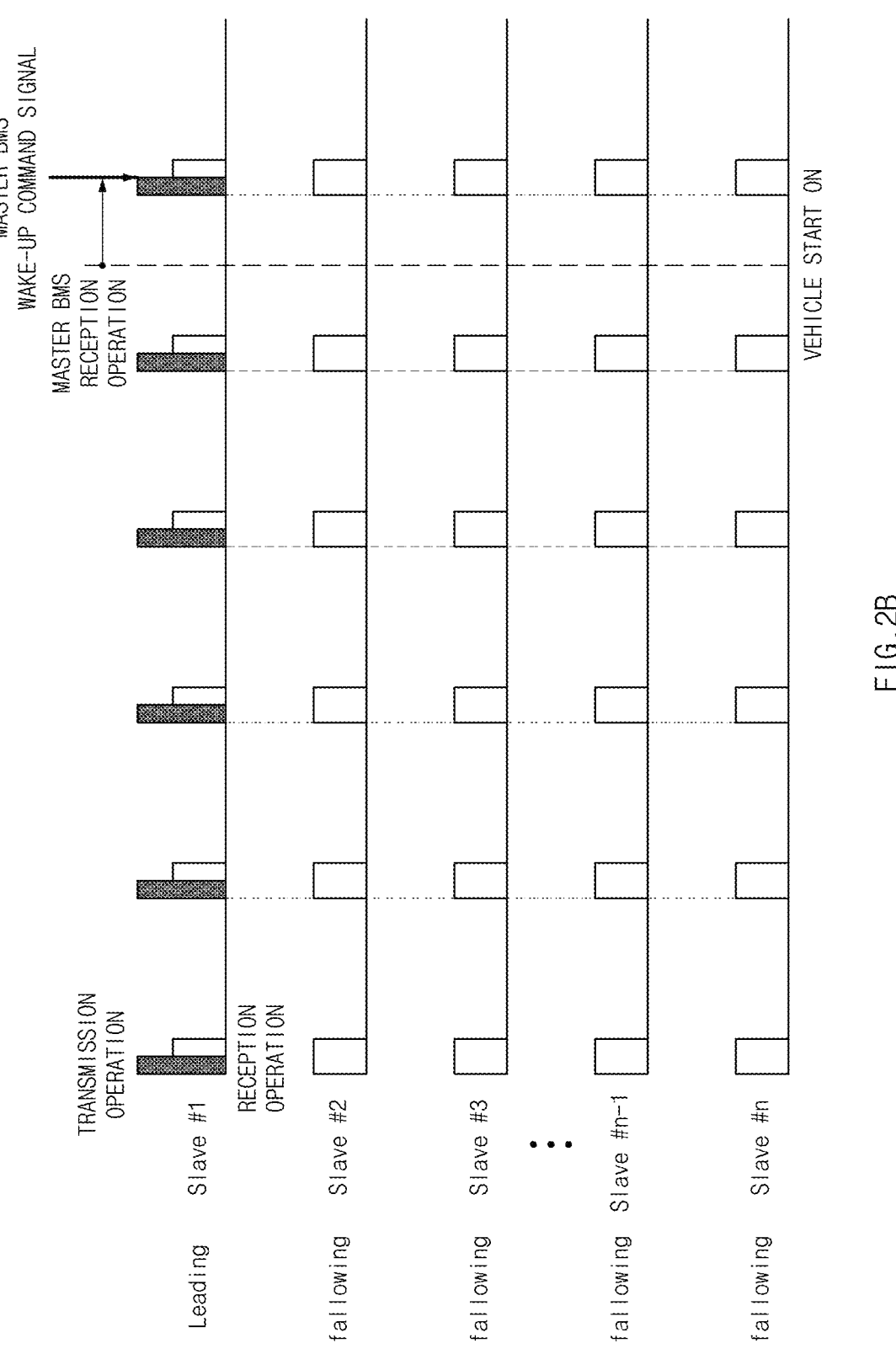
FIG. 2B is a diagram illustrating a communication operation of a battery management system according to an embodiment of the present invention.

FIG. 2A is a diagram illustrating a communication operation of a conventional battery management system, and FIG. 2B is a diagram illustrating a communication operation of a battery management system according to an embodiment of the present invention.

In the conventional battery management system, when the vehicle is parked, as shown in FIG. 2A, the slave battery management system checks whether a signal is transmitted from the master battery management system while periodically performing a reception operation. At this time, since the wake-up signal of the master battery management system is randomly transmitted, if the reception time of the slave battery management system is short or the reception period is long, the probability that the slave battery management system successfully receives a signal from the master battery management system is lowered. For example, it is preferable that the reception time of the slave battery management system is a time during which the signal of the master battery management system can be received at least twice or more.

In addition, in the related art, since the reception period is calculated using an internal real time clock (RTC) provided for each of the slave battery management systems, it is difficult to synchronize the reception times of the slave battery management systems. Therefore, in order to successfully receive the signal of the master battery management system in all slave battery management systems, it is necessary to transmit a wake-up command signal from the master battery management system for at least one period.

On the other hand, referring to FIG. 2B, in relation to a battery management system according to an embodiment of the present invention, one of the plurality of slave battery management systems may transmit a request signal to the master battery management system at the start time point of each reception period as the representative slave battery management system (the first slave battery management system). In this case, the remaining slave battery management systems (the second slave battery management system) may synchronize the reception period based on the request signal. Also, the representative slave battery management system may perform a reception operation for the wake-up signal within a predetermined time after the transmission of the request signal is finished.

In the case of the master battery management system, when the vehicle starts, once the reception operation is performed, it waits until the request signal of the slave battery management system selected as the representative is received and the reception is successful, a wake-up command signal may be transmitted to the slave battery management systems.

As such, according to the battery management system according to an embodiment of the present invention, since the master battery management system sends a wake-up signal to the slave battery management system after receiving the request signal, slave battery management systems can predict the transmission time of a wake-up signal, and since the reception period of the slave battery management systems is synchronized, the wake-up signal from the master battery management system can be successfully received at one time.

As in FIG. 2B, when the wake-up of both the master and the slave battery management system in the battery management system according to an embodiment of the present invention is completed, the slave battery management system may transmit data on the state (battery module voltage, temperature, etc.) of the battery module to the master battery management system, and the master battery management system may transmit various commands (e.g., a state monitoring command, a cell balancing command, a threshold value designation command for abnormality diagnosis, etc.) to the slave battery management system based on the received state information.

Meanwhile, although it is shown in FIG. 2B that one slave battery management system is selected as a representative in the battery management system according to an embodiment of the present invention, the representative slave battery management system may be selected as a plurality of slave battery management systems if necessary. In addition, although it is shown in FIG. 2B that one representative slave battery management system continuously performs a transmission operation, when a plurality of representative slave battery management systems are selected, each of the plurality of representative slave battery management systems alternately performs a transmission operation.

And when the vehicle is turned off, before the master battery management system turns off, based on the remaining SoC of the battery module, the slave battery management system selected as the representative may determine the order to be the target of the representative slave battery management system and transmit the order to the remaining slave battery management systems. Therefore, each slave battery management system may serve as a representative slave battery management system according to the order and number of times determined by the remaining SoC amount.

However, the representative slave battery management system according to the present invention is not determined only by the SoC, and may be determined in various ways, such as being directly set by the user or sequentially selected by the battery module order. In addition, instead of the representative slave battery management system, before the master battery management system is powered off, at least one slave battery management system among the plurality of slave battery management systems may be selected as the representative slave battery management system.

FIGS. 3A and 3B are diagrams for comparing power efficiency of a conventional battery management system and a battery management system according to an embodiment of the present invention.

In FIGS. 3A and 3B, a wake-up signal transmission period of the master battery management system is set to 1 ms, and a reception period for 12 slave battery management systems is set to 100 ms. In addition, the RF transmission (Tx) current and RF reception (Rx) current of the battery management system were set to 30 mA and 15 mA, respectively, and the current consumed by the slave battery management system while the vehicle's ignition was turned off was set to 50 μA. However, the specifications shown in FIGS. 3A and 3B are exemplary only, and the present invention is not limited thereto.

As shown in FIG. 3A, in the communication method of the conventional battery management system, in order to receive the wake-up signal of the master battery management system at least twice, the reception time of the slave battery management system is set to 3 ms. In this case, the current consumption of the battery management system per period is 59.82 mAh, and therefore, based on a battery pack with a specification of 400 V, 90 kWh, and SoC 30%, the number of parking available days for being parked is 47 days.

On the other hand, in the battery management system according to an embodiment of the present invention shown in FIG. 3B, the reception time and transmission time of the representative (#1) slave battery management system were set to 1 ms, respectively, and the reception time of the remaining slave battery management system was set to 2 ms. In this case, the current consumption of the battery management system per period is 44.37 mAh, and therefore, based on a battery pack with a specification of 400 V, 90 kWh, and SoC 30%, the number of parking available days is 64.8 days. That is, the battery management system according to an embodiment of the present invention may improve the current consumption per period by 27.5% compared to the prior art, and may further increase the number of parking available days by 17.8 days.

As such, according to the battery management system according to an embodiment of the present invention, as synchronizing the reception period of the slave battery management system after the slave battery management system sends a request signal for requesting a wakeup signal to the master battery management system, power can be used efficiently by reducing the current consumption of the battery module and the wake-up time of the battery management system can be shortened.

Figure 4A:
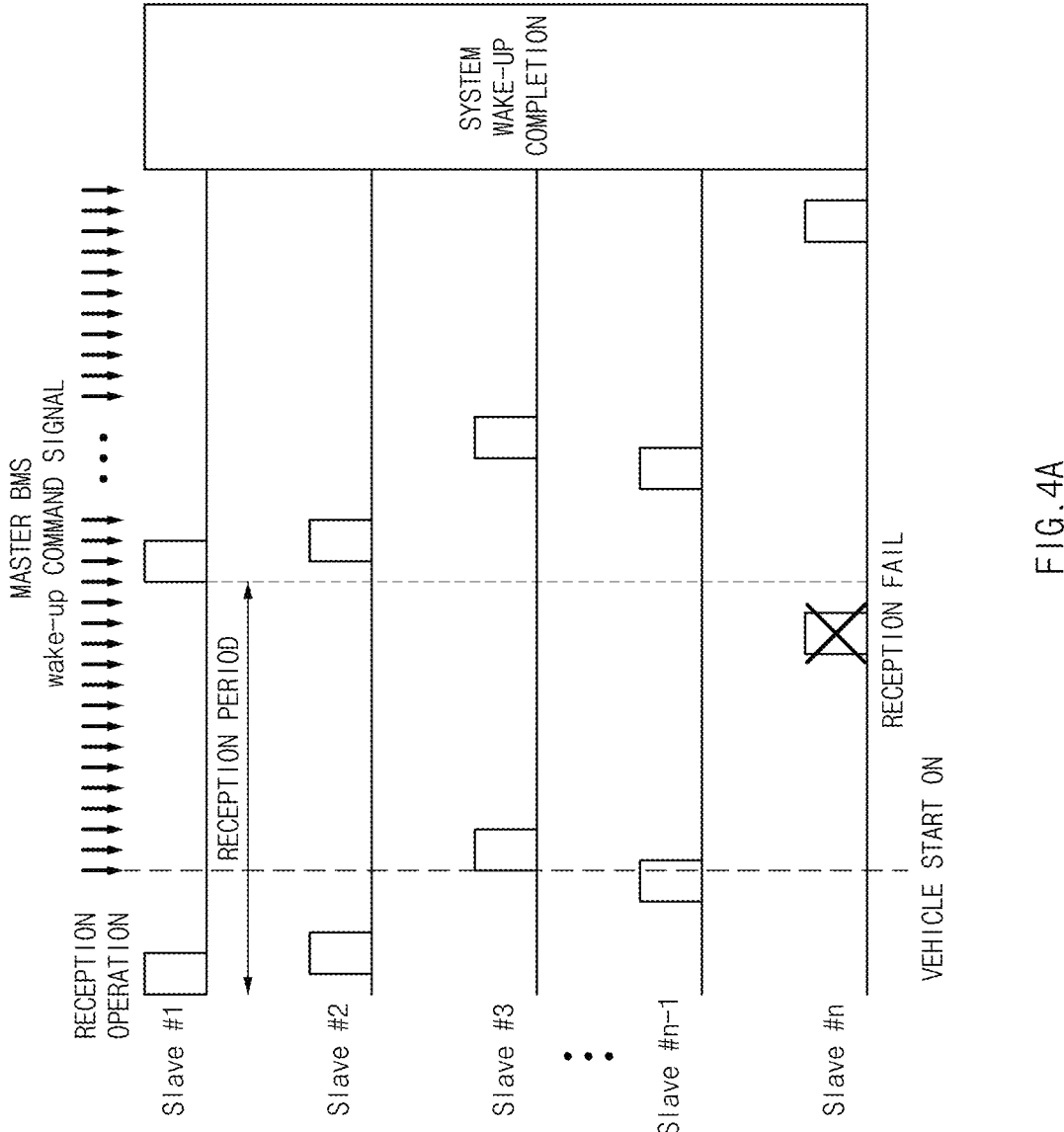
FIG. 4A is a diagram illustrating a communication operation of a conventional battery management system.
Figure 4B:
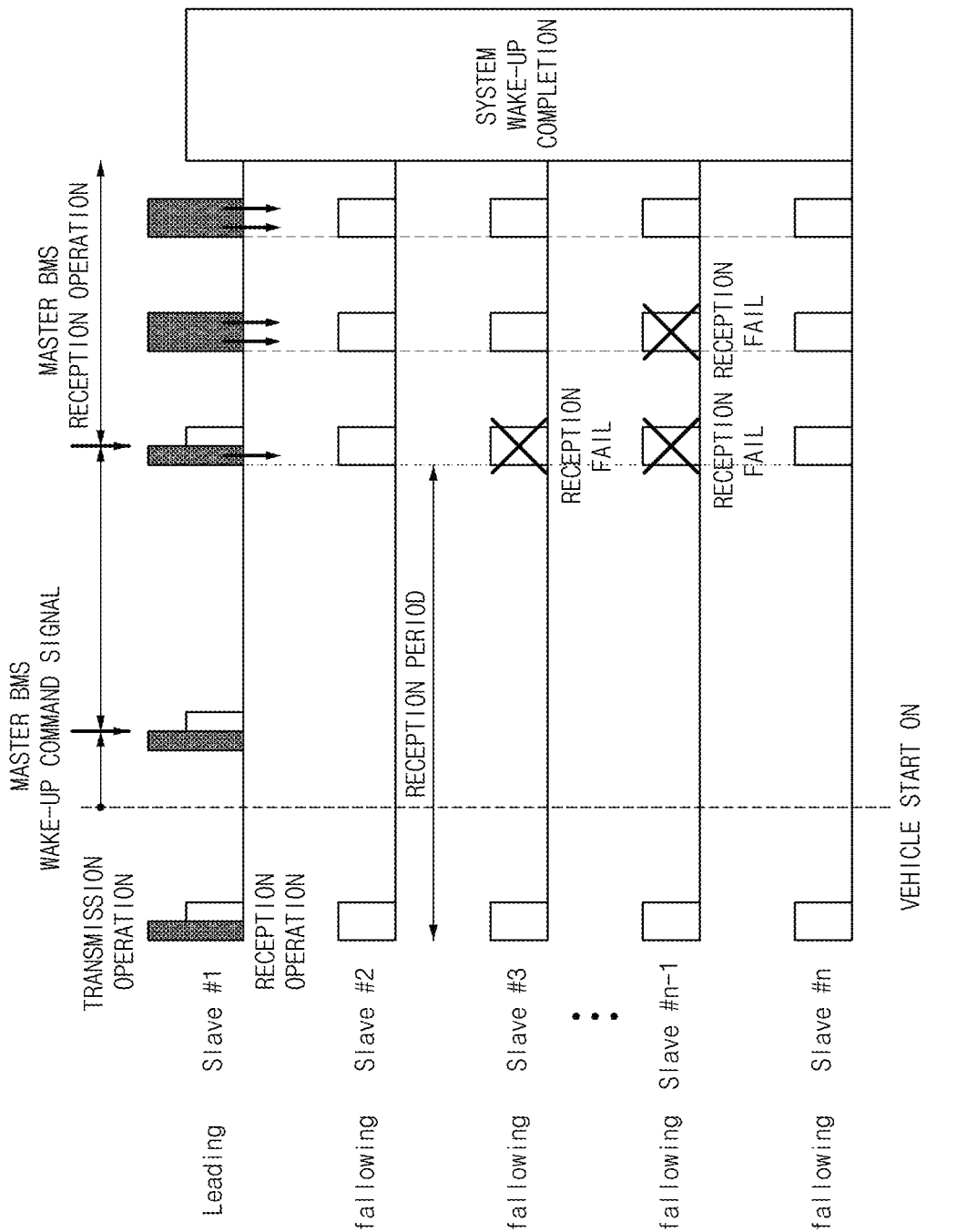
FIG. 4B is a diagram illustrating a communication operation of a battery management system according to another embodiment of the present invention.

FIG. 4A is a diagram illustrating a communication operation of a conventional battery management system, and FIG. 4B is a diagram illustrating a communication operation of a battery management system according to another embodiment of the present invention. FIGS. 4A and 4B are for explaining a case in which a reception period is increased (e.g., twice the size of FIGS. 3A and 3B) in order to reduce current consumption of the battery management system.

Referring to FIG. 4A, when the reception period of the slave battery management system in the conventional battery management system is 200 ms, compared to FIG. 3A, the average current consumption has the effect of reducing to 16.45 mAh, but the time required to receive a signal from the master battery management system and wake-up cannot be less than the reception period at least. In addition, if a specific (#n) slave battery management system misses the wake-up signal of the master battery management system even once due to signal failure such as noise, the total wake-up time of the battery management system may be probabilistically twice the maximum reception period.

On the other hand, as shown in FIG. 4B, the battery management system according to an embodiment of the present invention further transmits the request signal to the master battery management system by reducing the transmission period of the request signal in the slave battery management system selected as a representative by ½, so that the master battery management system is increasing the opportunity to receive a request signal from the representative slave battery management system.

If the representative slave battery management system performing transmission/reception operation in ½ period receives a wake-up signal from the master battery management system, the representative slave battery management system may first copy the received wake-up signal to the request signal and transmit the request signal to the remaining slave battery management systems.

Also, the representative slave battery management system may reduce the reception period of the remaining battery management systems. For example, the reception period of the remaining slave battery management systems may be reduced to a minimum frame unit in which the master battery management system can collect data from the slave battery management systems. In this way, even if there is a slave battery management system that fails to receive the wake-up signal, it is possible to successfully receive the wake-up signal within a short time.

As such, according to the battery management system of FIG. 4B, current consumption can be reduced to 15.96 mAh, and even if some slave battery management systems miss the wake-up signal, the total wake-up time of the battery management system can shorten the wake-up time as the reception period+α compared to the conventional battery management system.

Figure 5:
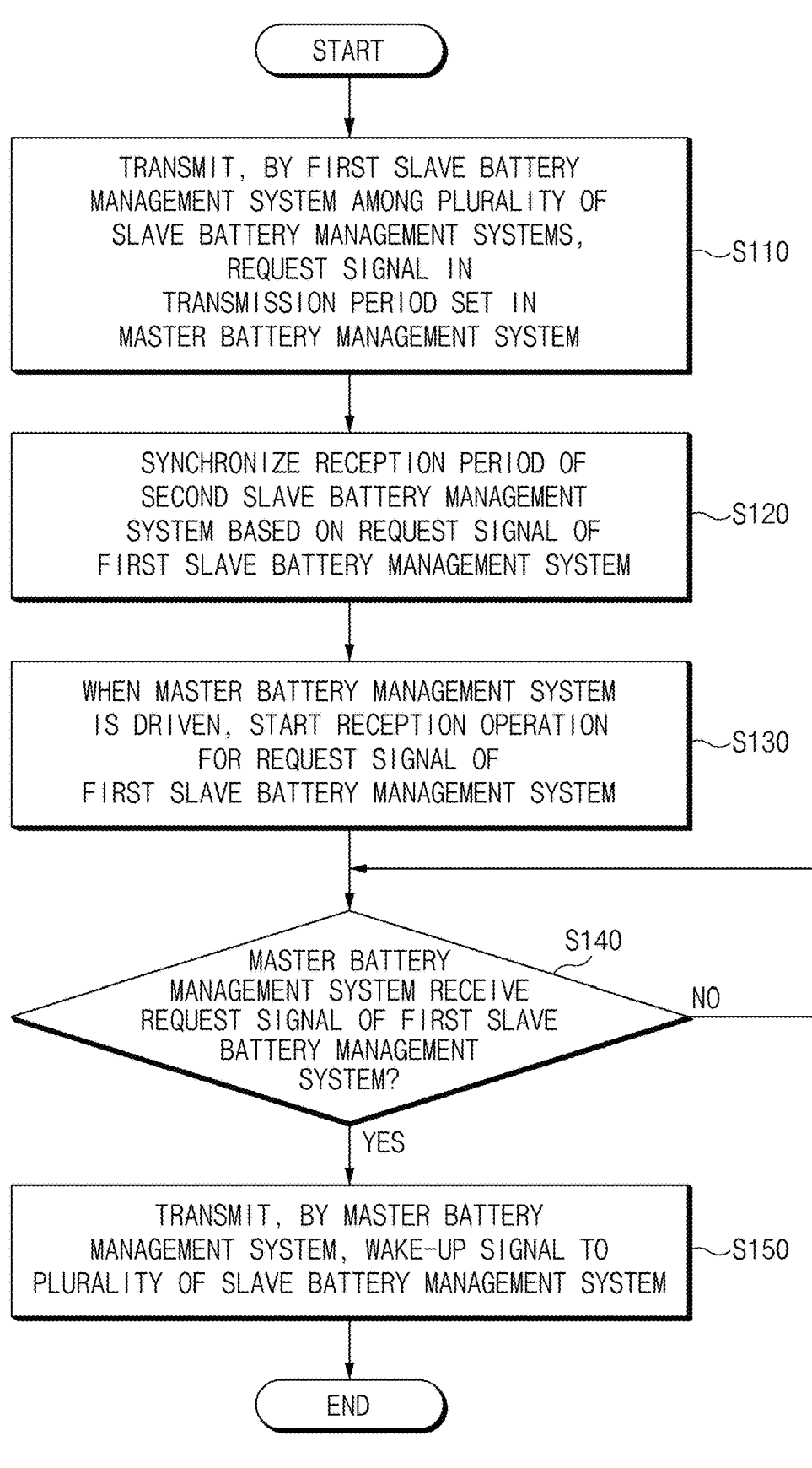
FIG. 5 is a flowchart illustrating a communication method of a battery management system according to an embodiment of the present invention.

FIG. 5 is a flowchart illustrating a communication method of a battery management system according to an embodiment of the present invention.

Referring to FIG. 5, first, a battery management system (a first slave battery management system) selected as a representative among a plurality of slave battery management systems transmits a request signal to the master battery management system in a preset transmission period (S110). In this case, the representative slave battery management system may be determined before the master battery management system is driven based on the SoC remaining amount of the battery module as described above. In addition, after performing the transmission operation, the representative slave battery management system may switch to the reception operation within a predetermined time in order to receive a wake-up signal from the master battery management system.

Then, the reception period of the remaining slave battery management system (the second slave battery management system) is synchronized based on the request signal of the representative slave battery management system (S120). Accordingly, the reception period of all the slave battery management systems for receiving the wake-up signal from the master battery management system may be the same.

When the master battery management system is driven, a reception operation for the request signal of the representative slave battery management system is started (S130). In this case, step S130 may be performed before step S110. That is, after the master battery management system is driven and the reception operation is started, the representative slave battery management system may transmit a request signal to the master battery management system to synchronize the reception period of the slave battery management system.

If the master battery management system does not receive the request signal of the representative slave battery management system (S140) (NO), the master battery management system continuously performs the reception operation until it receives the request signal. Meanwhile, if the master battery management system receives a request signal from the representative slave battery management system (YES), the master battery management system transmits a wake-up signal to the plurality of slave battery management systems (S150).

As such, when the wake-up of both the master and the slave battery management system in the battery management system according to an embodiment of the present invention is completed, the slave battery management system may transmit data on the state (battery module voltage, temperature, etc.) of the battery module to the master battery management system, and the master battery management system may transmit various commands (e.g., a state monitoring command, a cell balancing command, a threshold value designation command for abnormality diagnosis, etc.) to the slave battery management system based on the received state information.

As such, according to the communication method of the battery management system according to an embodiment of the present invention, since a request signal is transmitted from the representative slave battery management system to the master battery management system and the master battery management system transmits a wake-up signal based on these request signals, it is possible to predict the time at which the master battery management system transmits a wake-up signal. In addition, as synchronizing the reception period of the remaining slave battery management systems according to the request signal of the representative slave battery management system, all slave battery management systems can simultaneously receive a wake-up signal from the master battery management system.

Figure 6:
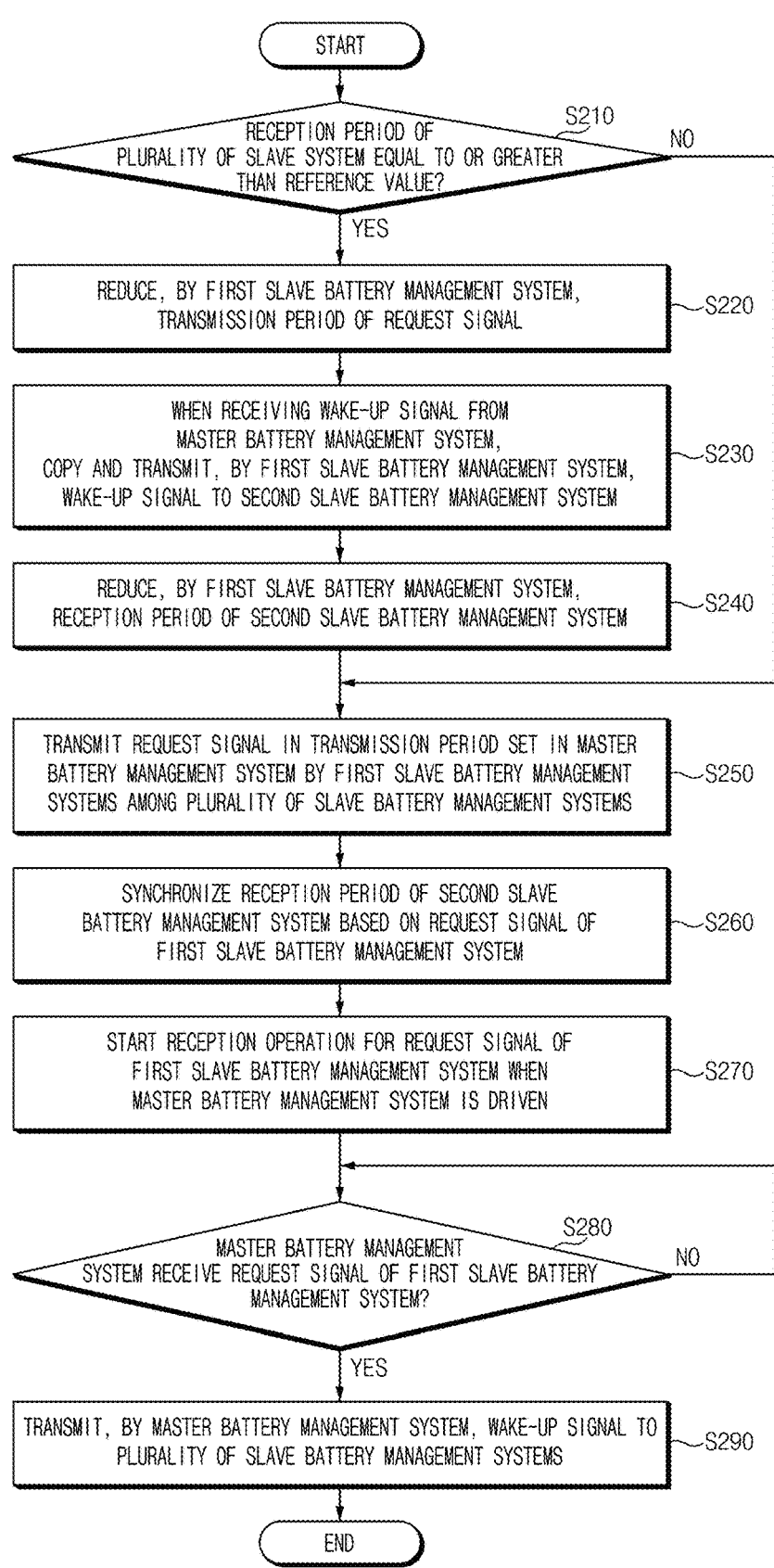
FIG. 6 is a flowchart illustrating a communication method of a battery management system according to another embodiment of the present invention.

FIG. 6 is a flowchart illustrating a communication method of a battery management system according to another embodiment of the present invention. Steps S250 to S290 in FIG. 6 are substantially the same as steps S110 to S150 of FIG. 5, and thus a detailed description thereof will be omitted.

Referring to FIG. 6, the battery management system according to another embodiment of the present invention first determines whether the reception period of the slave battery management system is equal to or greater than a reference value. In this case, the reference value of the reception period may be, for example, 200 ms. At this time, if the reception period of the slave battery management system is less than the reference value (NO), the process proceeds to step S250 and the same operation as in FIG. 5 may be performed.

If the reception period of the slave battery management system is equal to or greater than the reference value (YES), the representative slave battery management system (the first slave battery management system) may reduce the transmission period of the request signal (S220). For example, the representative slave battery management system may reduce the transmission period to ½ or less, thereby increasing the probability that the master battery management system receives a request signal from the representative slave battery management system.

Next, upon successful reception of a wake-up signal from the master battery management system, the representative slave battery management system may copy the wake-up signal and transmit the copied wake-up signal to the remaining battery management system (the second slave battery management system) (S230).

Also, the representative slave battery management system may reduce the reception period of the remaining slave battery management systems (S240). In this case, the reception period of the remaining slave battery management systems may be reduced to a minimum frame unit in which the master battery management system can collect data from the slave battery management systems.

As such, in the battery management system according to an embodiment of the present invention, the possibility that the remaining slave battery management systems receive the wake-up signal of the master battery management system may be increased through the operations of steps S230 and S240. Accordingly, even if reception of the wake-up signal fails due to communication failure such as noise among slave battery management systems, the reception time can be shortened to the maximum.

As such, according to the communication method of the battery management system according to an embodiment of the present invention, as synchronizing the reception period of the slave battery management system after the slave battery management system sends a request signal for requesting a wakeup signal to the master battery management system, power can be used efficiently by reducing the current consumption of the battery module and the wake-up time of the battery management system can be shortened.

Figure 7:
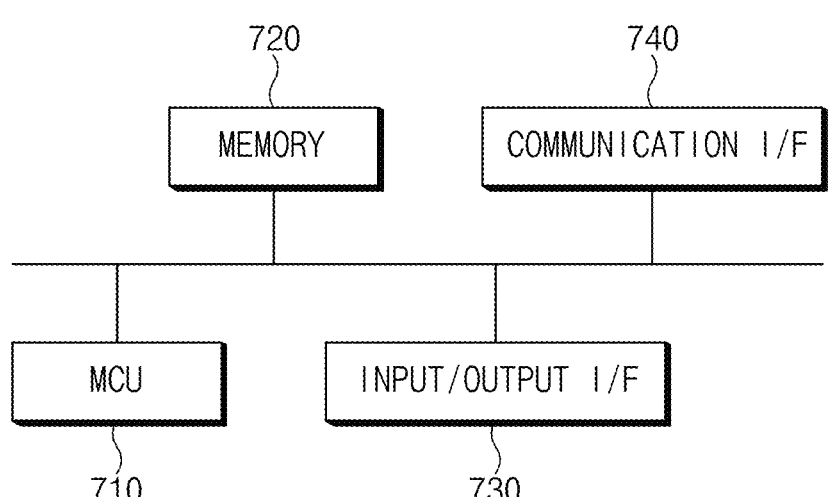
FIG. 7 is a block diagram illustrating a hardware configuration of a battery management system according to an embodiment of the present invention.

FIG. 7 is a block diagram illustrating a hardware configuration of a battery management system according to an embodiment of the present invention.

Referring to FIG. 7, the battery management system 700 may include a microcontroller (MCU) 710 for controlling various processes and each configuration, a memory 720 on which an operating system program and various programs (e.g., a battery state measurement program, a signal generation program, a reception synchronization program, etc.), an input/output interface 730 that provides an input interface and an output interface between the battery cell module and/or the semiconductor switching element, and a communication interface 740 capable of communicating with the outside through a wired/wireless communication network. In this way, the computer program according to the present invention may be recorded in the memory 720 and processed by the microcontroller 710, and for example, may be implemented as a module that performs various functions described with reference to FIGS. 2B and 4B.

In the above, even if all the components constituting the embodiments of the present invention are described as being combined into one or operating in combination, the present invention is not necessarily limited to these embodiments. That is, within the scope of the object of the present invention, all of the constituent elements may be selectively combined and operated in one or more.

In addition, terms such as "include", "consist of" or "have" described above mean that the corresponding constituent components can be present unless otherwise stated, and it should be construed that other components may be further included rather than excluding other components. All terms, including technical or scientific terms, have the same meaning as commonly understood by one of ordinary skill in the art, unless otherwise defined. Terms commonly used, such as terms defined in the dictionary, should be interpreted as being consistent with the meaning of the context of the related technology, and unless explicitly defined in the present invention, they are not interpreted in an ideal or excessively formal sense.

The above description is merely illustrative of the technical idea of the present invention, and those of ordinary skill in the art to which the present invention pertains will be able to make various modifications and variations without departing from the essential characteristics of the present invention. Therefore, the embodiments disclosed in the present invention are not intended to limit the technical idea of the present invention, but to explain, and the scope of the technical idea of the present invention is not limited by these embodiments. The scope of protection of the present invention should be interpreted by the claims below, and all technical ideas within the scope equivalent thereto should be construed as being included in the scope of the present invention.

The invention claimed is:

1. A battery management system for a battery pack having a plurality of battery modules connected in series or parallel, the battery management system comprising:
a master battery management system disposed in the battery pack and configured to transmit a wake-up signal to a plurality of slave battery management systems disposed respectively in the plurality of battery modules; and
the plurality of slave battery management systems each configured to periodically check for the wake-up signal at a reception period and to transmit state information of a corresponding one of the plurality of battery modules to the master battery management system if the wake-up signal is received,
wherein at least one first slave battery management system, among the plurality of slave battery management systems, is configured to transmit a request signal to the master battery management system at a start of the reception period of the at least one first slave battery management system to request the wake-up signal, and
wherein, based on the request signal, a second slave battery management system among the plurality of slave battery management systems is configured to synchronize the reception period of the second slave battery management system to the reception period of the at least one first slave battery management system.

2. The battery management system of claim 1, wherein the at least one first slave battery management system is configured to transmit the request signal to the master battery management system in a predetermined transmission period.

3. The battery management system of claim 1, wherein the master battery management system is configured to transmit the wake-up signal at least to the at least one first slave battery management system among the plurality of slave battery management systems upon receiving the request signal.

4. The battery management system of claim 2, wherein the at least one first slave battery management system is configured to perform a reception operation on the wake-up signal within a predetermined time after the transmission of the request signal is finished.

5. The battery management system of claim 2, wherein the at least one first slave battery management system is further configured to reduce the transmission period of the request signal based on whether the reception period of the plurality of slave battery management systems is equal to or greater than a preset reference value.

6. The battery management system of claim 5, wherein the at least one first slave battery management system is further configured to transmit the wake-up signal to the second slave battery management system if the wake-up signal is received from the master battery management system.

7. The battery management system of claim 5, wherein the at least one first slave battery management system is further configured to reduce the reception period of the second slave battery management system based on the wake-up signal received from the master battery management system.

8. The battery management system of claim 2, wherein the at least one first slave battery management system includes a plurality of first slave battery management systems, and wherein the plurality of first slave battery management systems are configured to alternately transmit the request signal to the master battery management system.

9. The battery management system of claim 2, wherein the master battery management system or the at least one first slave battery management system is further configured to determine at least one among the plurality of slave battery management systems as the at least one first slave battery management system before the master battery management system is turned off.

10. The battery management system of claim 2, wherein at least one slave battery management system among the plurality of slave battery management systems is determined as the at least one first slave battery management system based on an SOC of each of the corresponding battery modules.

11. The battery management system of claim 1, wherein:

the battery pack is in a vehicle; and the master battery management system is further configured to transmit the wake-up signal in response to the request signal after the vehicle is turned on.

* * * * *